United States Patent [19]
Yamanaka et al.

[11] Patent Number: 5,314,941
[45] Date of Patent: May 24, 1994

[54] THERMOPLASTIC ELASTOMER COMPOSITION OF CRYSTALLINE CHLORINATED POLYETHYLENE AND A RUBBER

[75] Inventors: Masahiro Yamanaka; Kazuya Hori; Naoki Ichikawa; Mizuo Washimi, all of Nagoya, Japan

[73] Assignee: Mitsubishi Kasei Vinyl Company, Tokyo, Japan

[21] Appl. No.: 883,394

[22] Filed: May 15, 1992

[30] Foreign Application Priority Data

May 16, 1991 [JP] Japan .................................. 3-111945

[51] Int. Cl.$^5$ ........................... C08J 5/10; C08K 3/26; C08L 23/28
[52] U.S. Cl. .................................... 524/425; 524/525; 524/445; 525/232; 525/235; 525/240
[58] Field of Search .................. 524/425, 525, 445; 525/240, 232, 234, 235

[56] References Cited

U.S. PATENT DOCUMENTS

| | | | |
|---|---|---|---|
| 4,426,497 | 1/1984 | Kent | 525/232 |
| 4,910,245 | 3/1990 | Flynn et al. | 524/298 |
| 4,978,703 | 12/1990 | Ainsworth et al. | 524/298 |

OTHER PUBLICATIONS

Database WPI, AN 80-49018c, & JP-A55-071-743, May 31, 1980, "Thermal Stabilised Chlorine Contain Resin Composition Contain Resin Blend Maleate Sorbic Acid".

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

A thermoplastic elastomer composition comprising, as resin components, 100 parts by weight of a crystalline chlorinated polyethylene with a chlorination degree of from 20 to 45% and a heat of crystal fusion of from 5 to 35 cal/g as measured by a DSC method and from 40 to 400 parts by weight of a rubber material having a solubility in tetrahydrofuran at 25° C. of not more than 50% by weight.

9 Claims, No Drawings

THERMOPLASTIC ELASTOMER COMPOSITION OF CRYSTALLINE CHLORINATED POLYETHYLENE AND A RUBBER

The present invention relates to a thermoplastic elastomer composition having excellent processability, and good high-temperature creep characteristics (compression set) without vulcanization or crosslinking being effected.

With respect to elastomer materials, there has been an increasing demand for improvement of their properties year by year. Particularly, in the field of automobiles, excellent compression set is demanded for materials of e.g. glass-runs, weather strips and window seals.

Heretofore, soft vinyl chloride resins have been widely used as such materials, since they have flexible rubber-like texture and they are superior to vulcanized rubber in the moldability, weather resistance and tinting properties, and they have an advantage also from the viewpoint of costs. However, they are inferior to vulcanized rubber in the compression set, and their softening point is low, whereby their application for high temperatures has been limited. An attempt has been made for improvement by modifying the vinyl chloride resins to have high degrees of polymerization, but no satisfactory results have been obtained.

Various proposals have also been made with an aim to improve the compression set of the vinyl chloride resins wherein nitrile rubbers having crosslinked structures are kneaded with vinyl chloride resins. However, such compositions are inferior in the processability, and have drawbacks in the productivity.

Further, Japanese Unexamined Patent Publication No. 309546/1988 discloses a process for producing an elastomer composition which comprises, as resin components, a chlorinated polyethylene, a vinyl chloride resin and a partially crosslinked acrylonitrile-butadiene copolymer. However, in this process, it is essential to use a vinyl chloride resin and to first prepare a precursor composition having the vinyl chloride resin, the partially crosslinked acrylonitrile-butadiene copolymer and a plasticizer uniformly dispersed and kneaded, and then add the chlorinated polyethylene and a crosslinking agent thereto, followed by blending and kneading. This process has a feature that the elastomer composition itself has a crosslinked structure. This publication discloses the effects of the composition such as oil resistance, weather resistance, ozone resistance and heat resistance, but does not teach a technical concept that good high-temperature creep characteristics are obtainable without crosslinking the composition, as in the present invention.

The present inventors have conducted extensive studies on a method for improving the compression set by blending a chlorinated polyethylene and a rubber material. As a result, they have found it possible to obtain an elastomer composition showing excellent high-temperature creep characteristics without vulcanization or crosslinking being effected, by kneading a crystalline chlorinated polyethylene having certain specific crystallinity and a rubber material having a crosslinked structure in the molecule. Further, it has been found that the processability of this composition can be improved and the processable conditions can be widened by incorporating a plasticizer or a fluorine-type surfactant. The present invention has been accomplished on the basis of these discoveries.

Namely, it is an object of the present invention to provide a thermoplastic elastomer composition having excellent high-temperature creep characteristics and good processability.

Thus, the present invention provides a thermoplastic elastomer composition comprising, as resin components, 100 parts by weight of a crystalline chlorinated polyethylene with a chlorination degree of from 20 to 45% and a heat of crystal fusion of from 5 to 35 cal/g as measured by a DSC method and from 40 to 400 parts by weight of a rubber material having a solubility in tetrahydrofuran (hereinafter referred to as THF) at 25° C. of not more than 50% by weight, and, as the case requires, a plasticizer or a fluorine-type surfactant.

Now, the present invention will be described in detail.

The crystalline chlorinated polyethylene to be used in the present invention is required to have a chlorination degree of from 20 to 45% and a heat of crystal fusion of from 5 to 35 cal/g, preferably from 5 to 25 cal/g, as measured by a DSC method. This range of the heat of crystal fusion corresponds to a polyethylene crystal residue i.e. a so-called crystallinity within a range of from 10 to 75%, preferably from 10 to 50%. The heat of crystal fusion as measured by a DSC method is the value calculated from the total area of crystal peaks of the DSC chart as measured at a temperature raising rate of 10° C./min by a differential scanning calorimeter, and the value being less than 5 cal/g indicates that there is no substantial remaining crystal.

Further, the crystal melting point as measured by a DSC method, which will be mentioned hereinafter, is a temperature of the maximum peak among all crystal peaks at the time of measuring the heat of crystal fusion by a DSC method. The crystal melting point of the chlorinated polyethylene to be used in the present invention is usually within a range of from 110 to 140° C. If the chlorination degree of the chlorinated polyethylene is less than 20%, the compatibility with the plasticizer tends to be poor, whereby it will be difficult to lower the hardness, and the weather resistance tends to be poor. On the other hand, if it exceeds 45%, the rubber elasticity tends to be low, and the desired compression set tends to be hardly obtained. Further, if the heat of crystal fusion is less than 5 cal/g, no adequate effect for improvement of the compression set tends to be obtained. On the other hand, if it exceeds 35 cal/g, it tends to be difficult to lower the hardness, and the amount of absorption of the plasticizer during processing tends to be low, whereby the kneading properties tend to be poor, and the compatibility with the plasticizer at a normal temperature tends to be poor, whereby bleeding is likely to result.

The rubber material to be used in the present invention, having the solubility in THF at 25° C. of not more than 50% by weight, may be produced by introducing a crosslinked structure into rubber molecules by e.g. a method wherein a polyfunctional monomer is added to the polymerization system during the production of a rubber such as acrylonitrile-butadiene rubber (NBR), methylmethacrylate-butadiene-styrene rubber (MBS), acrylic rubber (AR), butadiene rubber (BR), styrene-butadiene rubber (SBR), acrylonitrile-butadiene-styrene rubber (ABS), chloroprene rubber (CR), ethylene-vinyl acetate rubber (EVA) or urethane rubber (UR), or a method wherein crosslinking is conducted by means of an organic peroxide after the production of the rubber. It is particularly preferred to use the one wherein the crosslinked structure is formed by adding a polyfunctional monomer during the production of the rubber material. Further, it is preferred to use the one having a solubility of not more than 30% by weight. If the solubility of the rubber material exceeds 50% by weight, the object of improving the compression set can not be accomplished.

Thus, the amount of the rubber material is within a range of from 40 to 400 parts by weight, preferably from 100 to 300 parts by weight, per 100 parts by weight of the chlorinated polyethylene. If the amount of the rubber material is too small, the improvement of the compression set tends to be insufficient. on the other hand, if the amount is too large, the elastomer composition tends to be hard, whereby the processability and moldability of the composition tend to be poor.

By incorporating the plasticizer, the thermoplastic elastomer composition of the present invention can be made soft, whereby the kneading and processing can be facilitated, and the compression set can be improved.

The plasticizer is not particularly limited, and it may, for example, be a phthalate plasticizer such as di-2-ethylhexyl phthalate, di-n-octyl phthalate, diisodecyl phthalate, dibutyl phthalate or dihexyl phthalate; a straight chain dibasic acid ester plasticizer such as dioctyl adipate, or dioctyl sebacate; a trimellitate plasticizer; a polyester polymer plasticizer; an epoxy plasticizer such as epoxidized soybean oil, epoxidized linseed oil or an epoxy resin; a phosphate plasticizer such as triphenyl phosphate, trixylyl phosphate or tricresyl phosphate. These plasticizers may be used alone or in combination as a mixture of two or more of them.

The amount of the plasticizer is suitably determined depending upon the crystallinity of the chlorinated polyethylene, the types of the rubber materials, the added amounts thereof, the presence of fillers, etc. It is usually selected within a range of not more than 200 parts by weight, preferably, from 10 to 150 parts by weight per 100 parts by weight of the chlorinated polyethylene.

By adding the fluorine-type surfactant to the elastomer composition of the present invention, the heat generation of the composition tends to be low, even if a strong shearing force is applied thereto, whereby the kneading or processing conditions may be expanded to facilitate the processing of the composition.

The fluorine-type surfactant to be used in the present invention, includes, for example, compounds of the following formulas 1 to 6:

$R_f$—A—O—$R_1$    Formula 1

$R_f$—A—O—$(C_2H_4O)_m$—A—$R_f$    Formula 2

$R_f$—$R_2$—A—O—$(C_2H_4O)_m$—A—$R_2$—$R_f$    Formula 3

$R_f$—B—NH$R_3$—$R_2$—O—$(C_2H_4O)_m R_2$—NH-$R_3$—B—$R_f$    Formula 4

$R_f$—B—O—$(C_2H_4O)_m$—B—$R_f$    Formula 5

$R_f$—$R_2$—O—$(C_2H_4O)_m$—$R_2$—$R_f$    Formula 6 wherein A is —$CH_2$—$CH(OR_4)$—$CH_2$—, B is —CO— or —$SO_2$—, $R_f$ is a fluroine-containing aliphatic group of from 3 to 21 carbon atoms (hereinafter referred to as $C_{3-21}$), $R_1$ is —$(C_2H_4O)_m R_3$ or —$(C_2H_4O)_m R_5$, $R_2$ is a methylene group or a $C_{2-5}$ alkylene group, $R_3$ is a hydrogen atom, $C_{1-18}$ alkyl group or an acyl group, $R_4$ is a hydrogen atom or a $C_{1-3}$ acyl group, $R_5$ is a $C_{1-10}$ alkylphenyl group, and m is an integer of from 1 to 30.

A plurality of the same symbols in the same formula may represent the same or different substituents. Specific examples of the fluorine-type surfactant include:

$C_6F_{13}CH_2CH(OH)CH_2O(C_2H_4O)_5H$,
$C_9F_{19}CH_2CH(OCOCH_3)CH_2O(C_2H_4O)_8COCH_3$,
$C_{15}F_{31}CH_2$-$CH(OCOC_2H_5)CH_2O$ $(C_2H_4O)_{22}$-$(C_6H_4)$-$C_9H_{19}$,
$C_8F_{17}CH_2CH(OH)CH_2O$    $(C_2H_4O)_{10}CH_2CH(OH)CH_2C_8F_{17}$,
$C_{10}F_{21}C_2H_4OCH_2CH(OH)CH_2O(C_2H_4O)_8CH_2CH(OH)CH_2OC_2H_4C_{12}F_{25}$,
$C_8F_{17}CONHC_2H_4O(C_2H_4O)_6C_2H_4NHCOC_6F_{13}$,
$C_8F_{17}SO_2N(C_2H_5)$    $C_2H_4O(C_2H_4O)_8C_2H_4N(C_2H_5)SO_2C_6F_{13}$,
$C_{10}F_{21}COO(C_2H_4O)_8COC_{10}F_{21}$,
$C_8F_{17}C_2H_4O(C_2H_4O)_{10}C_2H_4C_8F_{17}$

The fluorine-type surfactant to be used in the present invention is not restricted to the ones mentioned above. For example, the fluorine-containing compounds (fluorine-type surfactants) of the formulas (1) to (16) disclosed from the 3rd column to the 8th column of Japanese Examined Patent Publication No. 12932/1987, may be employed.

Such fluorine-type surfactants may be employed alone or in combination of two or more.

The fluorine-type surfactant is used usually in an amount of not more than 50 parts by weight, preferably from 2 to 40 parts by weight, per 100 parts by weight of the chlorinated polyethylene.

To the composition of the present invention, an inorganic filler such as calcium carbonate or talc, may be added within a range not to impair the compression set, in view of the economical merit. It is effective to add the filler to adsorb an excess amount of the plasticizer and to conduct the kneading smoothly. It is used preferably within a range of not more than 150 parts by weight, more preferably from 10 to 150 parts by weight, per 100 parts by weight of the chlorinated polyethylene taking into account the desired compression set, hardness or the like.

To the elastomer composition of the present invention, various additives such as a stabilizer, a lubricant, an antioxidant, an ultraviolet absorber, a blowing agent, a flame retardant, a pigment and an impact resistance-improving agent, may be incorporated, as the case requires.

To prepare the thermoplastic elastomer composition of the present invention, the chlorinated polyethylene and the rubber material having the solubility in THF of not more than 50% by weight, etc. are kneaded, if necessary together with the plasticizer, the fluorine-type surfactant or other additive, under a shearing force while heating at a temperature of at least the crystal melting point of the crystalline chlorinated polyethylene. By kneading under such conditions, it is possible to obtain an elastomer composition which is excellent in the high-temperature creep characteristics (compression set). Particularly, if the kneading is conducted at a temperature higher than the crystal melting point, it is believed that the plasticizer penetrates also to the crystal portions, whereby a new network structure will be formed among molecular chains when the chlorinated polyethylene is recrystallized, and the rubber elasticity such as compression set will thereby be improved.

An apparatus to be used for mixing the above described blend components, may be any apparatus so long as it is capable of uniformly mixing them. For example, it may be a Henshel mixer, a ribbon blender or a planetary mixer. To knead the mixture, an apparatus capable of kneading it under a shearing force under heating, such as an extruder, a roll mill, a Banbury mixer or a kneader, can be used. As a kneading method, it is possible to employ a method wherein an extruder having a multistage inlets, is used so that in an earlier stage the resin components and various additives are introduced, and at a later stage, the plasticizer is introduced. The upper limit of the heating temperature is preferably within a range where a heat deterioration of the chlorinated polyethylene is negligible, specifically not higher than 210° C. Further, the kneading temperature is usually within a range of from 130° to 210° C., preferably from 150° to 200° C.

The thermoplastic elastomer composition of the present invention has excellent high-temperature creep characteristics simply by blending and kneading the crystalline chlorinated polyethylene and the rubber material containing a gel content insoluble in THF. The incorporation of the plasticizer facilitates the kneading and processing. Further, the incorporation of the fluorine-type surfactant is effective in suppressing the temperature-rising width even if a strong shearing force is applied during the kneading, and in expanding the scope of selection of the processing conditions. Thus, the composition of the present invention may be produced by a conventional method such as an extrusion molding, a compression molding, a calender processing, a blow molding or an injection molding. The composition of the present invention has a considerably improved processability, and can be formed into a molded product having excellent high-temperature creep characteristics. The molded product may, for example, be a window sealing material for automobiles, a sheath material for electric wires, and a packing, and is valuable in the use of various fields wherein the high-temperature creep characteristics are required.

Now, the present invention will be described in further detail with reference to Examples. However, it should be understood that the present invention is by no means restricted to such specific Examples.

Various properties of the thermoplastic elastomer composition were evaluated as follows and shown in Table 2.

(1) Hardness:
With respect to the same test piece as used for the measurement of the compression set, the hardness was measured in accordance with JIS K6301 (JIS A hardness).

(2) Compression set:
Measured in accordance with JIS K6301 at 70° C. for 22 hours under a compression of 25%.

(3) Processability:
Condition 1: indicated by the ultimate resin temperature (° C.) when the kneading is conducted at 50 rpm for 10 minutes by a Brabender Plastograph at a cell temperature of 150° C.

Condition 2: indicated by the ultimate resin temperature (° C.) when the kneading is conducted at 100 rpm for 5 minutes after the kneading under Condition 1.

EXAMPLES 1 TO 22 AND COMPARATIVE EXAMPLES 1 TO 4

The chlorinated polyethylene (CPE), rubber material (rubber), plasticizer (PLS), fluorine-type surfactant (FSA) and inorganic filler (calcium carbonate) of the types and amounts (parts by weight) as identified in Table 1, and 4 parts of a lead-type powder stabilizer were mixed in a beaker, and the mixture was kneaded by a Brabender Plastograph at a cell temperature of 150° C. at 50 rpm for 10 minutes and further kneaded by mill rolls at a surface temperature of 130° C. for 5 minutes to obtain a sheet. This sheet was further pressed at 180° C. for 5 minutes to obtain a test piece having a predetermined thickness.

COMPARATIVE EXAMPLE 5

100 parts by weight of a chlorinated vinyl resin having a degree of polymerization of 2,500, 100 parts by weight of di-2-ethylhexyl phthalate (DOP), 100 parts by weight of a partially crosslinked NBR having a solubility in THF of 20% by weight, and 3 parts by weight of dibutyltin maleate were kneaded by mill rolls at a temperature of 180° C. for 10 minutes to obtain a sheet. This sheet was further pressed at 180° C. to obtain a test piece having a predetermined thickness.

TABLE 1

| No. | CPE*1 Type | CPE*1 Amount | Rubber*2 Type | Rubber*2 Amount | PLS*3 Type | PLS*3 Amount | FSA*4 Type | FSA*4 Amount | Calcium carbonate Type | Calcium carbonate Amount |
|---|---|---|---|---|---|---|---|---|---|---|
| Example 1 | a | 100 | v | 100 | | | | | | |
| Example 2 | a | 100 | v | 300 | | | | | | |
| Example 3 | a | 100 | w | 200 | | | | | | |
| Example 4 | a | 100 | x | 100 | | | | | | |
| Example 5 | a | 100 | y | 100 | | | | | | |
| Example 6 | a | 100 | z | 100 | | | | | | |
| Example 7 | b | 100 | v | 100 | | | | | | |
| Example 8 | a | 100 | v | 200 | l | 60 | | | | |
| Example 9 | b | 100 | v | 200 | l | 120 | | | | |
| Example 10 | a | 100 | v | 200 | l | 100 | | | | |
| Example 11 | b | 100 | z | 200 | l | 100 | | | | |
| Example 12 | b | 100 | x | 200 | l | 100 | | | | |
| Example 13 | b | 100 | v | 200 | m | 90 | | | | |
| Example 14 | b | 100 | v | 200 | n | 125 | | | | |
| Example 15 | a | 100 | v | 200 | | | j | 10 | | |
| Example 16 | a | 100 | v | 200 | | | j | 30 | | |
| Example 17 | a | 100 | z | 200 | | | k | 30 | | |
| Example 18 | a | 100 | v | 200 | l | 60 | j | 30 | | |
| Example 19 | b | 100 | v | 200 | l | 60 | k | 30 | | |
| Example 20 | b | 100 | x | 200 | n | 75 | j | 30 | | |
| Example 21 | b | 100 | v | 200 | l | 100 | — | | g | 100 |

TABLE 1-continued

| No. | CPE*1 Type | CPE*1 Amount | Rubber*2 Type | Rubber*2 Amount | PLS*3 Type | PLS*3 Amount | FSA*4 Type | FSA*4 Amount | Calcium carbonate Type | Calcium carbonate Amount |
|---|---|---|---|---|---|---|---|---|---|---|
| Example 22 | b | 100 | v | 200 | m | 90 | j | 30 | g | 100 |
| Comparative Example 1 | a | 100 | | | | | | | | |
| Comparative Example 2 | a | 100 | v | 900 | | | | | | |
| Comparative Example 3 | c | 100 | v | 100 | | | | | | |
| Comparative Example 4 | a | 100 | u | 100 | | | | | | |

*1: Chlorinated polyethylene (all manufactured by Showa Denko K.K.)
a: ELASLEN ® 303B (chlorination degree: 30%, heat of crystal fusion: 12 cal/g, crystal melting point: 123° C.)
b: ELASLEN ® 303C (chlorination degree: 30%, heat of crystal fusion: 20 cal/g, crystal melting point: 127° C.)
c: ELASLEN ® 401A (chlorination degree: 40%, heat of crystal fusion: 0.5 cal/g, non-crystalline)
*2:
v: PBN-7 manufactured by Nippon Gosei Gomu K.K., solubility in THF: 5% (NBR)
w: PNC-17 manufactured by Nippon Gosei Gomu K.K., solubility in THF: 22% (NBR)
u: N230S manufactured by Nippon Gosei Gomu K.K., solubility in THF: 64% (NBR)
x: obtained by adding 0.05% of dicumyl peroxide to u, followed by crosslinking treatment, solubility in THF: 22% (NBR)
y: KM-323B manufactured by Rohm & Haas Co., solubility in THF: 8% (acrylic rubber)
z: HIA-28 manufactured by Kureha Kaguku K.K., solubility in THF: 6% (MBS rubber)
*3:
l: Di-2-ethylhexyl phthalate (DOP)
m: Di-isononyl adipate
n: adipic acid-type polyester (molecular weight: 1,800)
*4:
j: $C_8F_{17}CH_2CH(OH)CH_2O(C_2H_4O)_7H$
k: $C_{10}F_{21}C_2H_4OCH_2CH(OH)CH_2O(C_2H_4O)_6CH_2CH(OH)CH_2OC_2H_4C_8F_{17}$

TABLE 2

| No. | Hardness | Compression set (%) | Processability (resin temperature) Condition 1 | Processability (resin temperature) Condition 2 |
|---|---|---|---|---|
| Example 1 | 64 | 44 | 191 | — |
| Example 2 | 50 | 25 | 203 | — |
| Example 3 | 54 | 36 | 188 | — |
| Example 4 | 57 | 42 | 190 | — |
| Example 5 | 77 | 46 | 193 | — |
| Example 6 | 81 | 47 | 195 | — |
| Example 7 | 84 | 32 | 190 | — |
| Example 8 | 38 | 22 | 171 | 208 |
| Example 9 | 40 | 20 | 159 | 205 |
| Example 10 | 27 | 22 | 169 | 207 |
| Example 11 | 67 | 28 | 175 | — |
| Example 12 | 47 | 21 | 170 | — |
| Example 13 | 42 | 20 | 171 | — |
| Example 14 | 47 | 21 | 170 | 205 |
| Example 15 | 57 | 27 | 170 | 193 |
| Example 16 | 58 | 28 | 165 | 180 |
| Example 17 | 57 | 29 | 167 | 181 |
| Example 18 | 37 | 19 | 164 | 172 |
| Example 19 | 59 | 19 | 168 | 173 |
| Example 20 | 58 | 20 | 169 | 170 |
| Example 21 | 51 | 23 | 172 | 195 |
| Example 22 | 52 | 24 | 168 | 175 |
| Comparative Example 1 | 75 | 52 | 167 | — |
| Comparative Example 2 | 47 | 15 | 205 | — |
| Comparative Example 3 | 35 | 75 | 180 | — |
| Comparative Example 4 | 50 | 65 | 187 | — |
| Comparative Example 5 | 55 | 45 | — | — |

We claim:

1. A thermoplastic elastomer composition comprising, as resin components, 100 parts by weight of a crystalline chlorinated polyethylene with a chlorination degree of from 20 to 45% and a heat of crystal fusion of from 5 to 35 cal/g as measured by a DSC method and from 40 to 400 parts by weight of a rubber material having a solubility in tetrahydrofuran at 25° C. of not more than 50% by weight.

2. The thermoplastic elastomer composition according to claim 1, wherein the rubber material is in an amount of from 100 to 300 parts by weight.

3. The thermoplastic elastomer composition according to claim 1, which contains a plasticizer.

4. The thermoplastic elastomer composition according to claim 3, wherein the plasticizer is in an amount of from 10 to 150 parts by weight.

5. The thermoplastic elastomer composition according to claim 1, which contains a fluorine-type surfactant.

6. The thermoplastic elastomer composition according to claim 5, wherein the fluorine-type surfactant is in an amount of from 2 to 40 parts by weight.

7. The thermoplastic elastomer composition according to claim 1, which contains a filler.

8. The thermoplastic elastomer composition according to claim 7, wherein the filler is calcium carbonate or clay.

9. The thermoplastic elastomer composition according to claim 7, wherein the filler is in an amount of from 10 to parts by weight.

* * * * *